United States Patent [19]

Sugino

[11] 4,421,210

[45] Dec. 20, 1983

[54] WHEEL STOP APPARATUS

[75] Inventor: Yosiharu Sugino, Nagoya, Japan

[73] Assignee: Sugino Press Co., Ltd., Japan

[21] Appl. No.: 285,859

[22] Filed: Jul. 22, 1981

[51] Int. Cl.³ .............................................. B60T 3/00
[52] U.S. Cl. ........................................ 188/32; 16/268
[58] Field of Search ................................ 108/129, 132; 248/188.6; 188/32; 16/268; D12/217

[56] References Cited

U.S. PATENT DOCUMENTS

| 1,617,369 | 2/1927 | Blakely | 188/32 |
| 1,768,265 | 6/1930 | Nicholls | 188/32 |
| 1,849,964 | 3/1932 | Snyder | 188/32 |
| 3,647,029 | 3/1972 | Hanley | 188/32 |
| 4,109,763 | 8/1978 | Sugino | 188/32 |
| 4,140,206 | 2/1979 | Yamazaki et al. | 188/32 |

FOREIGN PATENT DOCUMENTS

| 457706 | 6/1927 | Fed. Rep. of Germany | 188/32 |
| 300232 | 9/1954 | Switzerland | 188/32 |

*Primary Examiner*—Robert J. Spar
*Assistant Examiner*—R. R. Diefendorf
*Attorney, Agent, or Firm*—Jones & Askew

[57] ABSTRACT

A wheel stop apparatus comprising a stopper plate, one end of which is pivotally attached to a bottom plate. The present improvement includes a prolonged shaft-like portion formed in a supporting plate having rises positioned on either side of said prolonged shaft-like portion so as to maintain and stabilize the stopper plate.

3 Claims, 8 Drawing Figures

WHEEL STOP APPARATUS

BACKGROUND OF THE INVENTION

A conventional wheel stop apparatus, an example of which is shown in FIG. 1, is comprised of a ramp board 15 pivotally mounted to one end edge of a bottom plate 9 by a support shaft 5. The other end edge of the ramp board 15 is pivotably mounted upon the ends of a substantially U-shaped member 7 formed by the bending of a rod-like material. Such a structure is expensive in cost and heavy in weight because of the different types of plates, rods, shafts and the various types of materials needed to form such plates, rods, shafts, and the like. Furthermore, many man-hours are demanded for fabrication thereof.

In order to remedy such drawbacks, the present applicant invented a wheel stop apparatus according to the structure shown in FIG. 2, for which U.S. Pat. No. 4,109,763 was granted. The apparatus of U.S. Pat. No. 4,109,763 provides a structure that is fitted between a groove 33 of a support plate 23 having a broad bearing portion 25 secured to a stopper plate 15. The apparatus disclosed in U.S. Pat. No. 4,109,763 has a problem with instability due to an oscillating effect which occurred between the stopper plate 15 and the support plate 23.

SUMMARY OF THE INVENTION

The present invention comprises an improvement over U.S. Pat. No. 4,109,763. The improvement includes certain techniques wherein the bearing portions of the ramp board 15 comprise a prolonged shaft-like portion which is formed by cutting off the top portion of the support plate. Small rises are positioned on either side of the prolonged shaft-like portion and are butted against and engaged by the top edge of the support plate 23. The present invention further comprises other related techniques.

Accordingly, it is an object of the present invention to improve on the construction of U.S. Pat. No. 4,109,763.

It is another object of the present invention to improve the conventional wheel stop apparatus.

DETAILED DESCRIPTION OF THE PREFERRED EMBODIMENT

Figure 1:
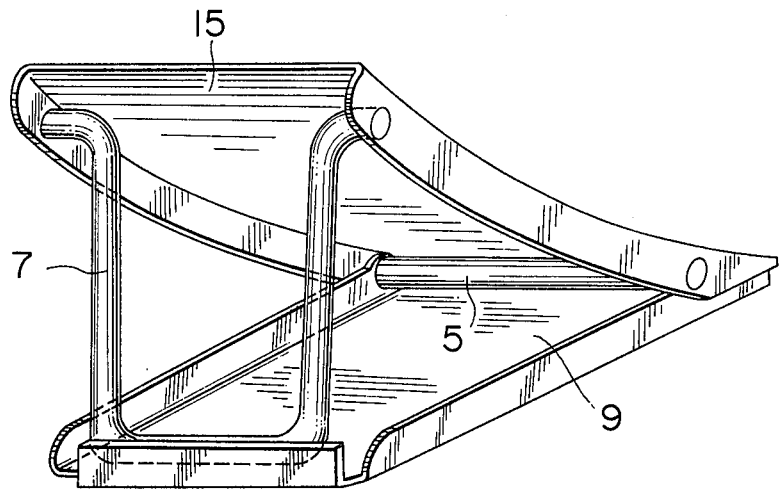
FIG. 1 shows an illustrative example of a conventional wheel stop apparatus.

The present invention will be illustrated with particular reference to FIGS. 3-8.

A bottom plate 9 is bent upwards so as to form two lateral plates 11, these lateral plates being on either side of the bottom plate 9 and formed so as to further comprise a checking portion 13 at one end thereof. The bottom plate 9 further comprises two crossed grooves 10 of corner cross-section formed in the surface thereof. The bottom plate further comprises two reinforcing hollows 39 which are formed at the forward end of the bottom plate 9, and also comprises a plurality of reinforcement notches 37 formed at the opposite end from said reinforcement hollows to reinforce the bottom plate.

One end of the ramp board 15 is pivotably mounted to the rear end of the bottom plate 9. As shown best in FIG. 8, a shaft member 19 is rotatably fitted into the lateral plates 17 in the stopper plate 15 and further rotatably fitted in the lateral plates 11 of the bottom plate 9. The bottom plate 9 may be collapsed so as to be retained within said stopper plate 15 and thus, the shaft 19 may be so retained by partial punching of the lateral plates 17 in the stop plate 15, and by further partial punching in the lateral plates 11 of the bottom plate 9.

The lateral plates 17 in the stop plate 15 are formed having thickened portions 18 and thus, the lateral plates 17 may be folded even if the lateral plates 11 of the bottom plate 9 are deformed when being used.

Figure 5:
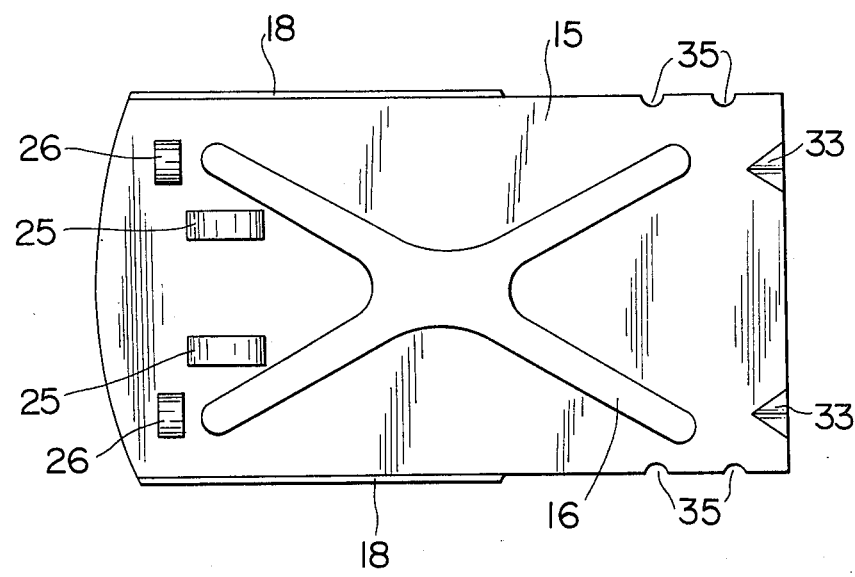
FIG. 5 is a plan view of a stopper plate of the embodiment shown in FIG. 3.
Figure 6:
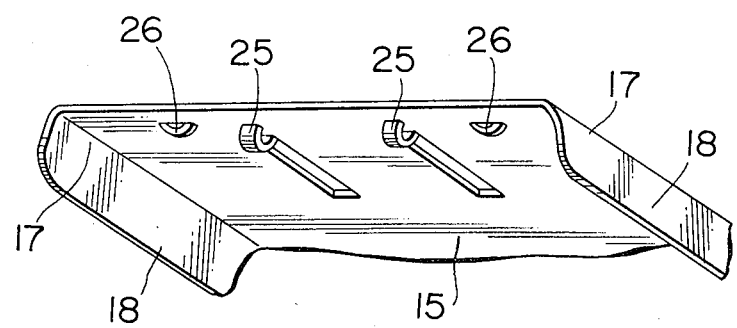
FIG. 6 is a cutaway view showing the principal part of a stopper plate of the embodiment shown in FIG. 3.

As will be understood from a review of FIGS. 5 and 6, the surface of the ramp board 15 is also formed having a cross grooved section 16, and is further formed having a concave shape so as to check wheels resting thereon. A reinforcement member 33 and a notch 35 are arranged on the ramp board 15 at suitable positions adjacent to the axial shaft 19. Two axial support positions 25 are formed by cutting openings therefor in the underside of said ramp board 15 so as to position the axial support portions 25 in the uppermost central portion of the ramp board 15. In a little higher position relative to said two axial support portions 25, two checking rises 26 are placed on either side thereof so as to extend downward into the notch 35 of said ramp board 15.

Figure 7:
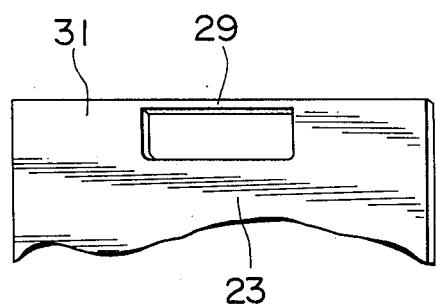
FIG. 7 is a cutaway view showing the principal part of the support plate of the embodiment shown in FIG. 3.
Figure 8:
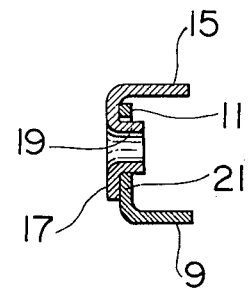
FIG. 8 is a section view of the embodiment shown in FIG. 3 showing the stopper plate and lateral plate in a pivoted posture.

A check plate 23 is arranged to lift and support the ramp board 15 on the bottom plate 9, and the check plate is formed having a transversely prolonged axial portion 29 by punching the top portion of the check plate along the end edge 31 thereof shown in FIG. 7.

The check plate 23 is pivotally mounted to the ramp board 15 by inserting said axial portion 29 of the check plate into the axial supports 25 of the ramp board 15. Furthermore, the end edge 31 is fitted to the check rises 26 of the ramp board 15. When the check plate 23 is formed with a groove 24 having suitable rise or dent shape, the check plate 23 is butted against the ramp board 15 so as to prevent any backward movement thereof. The bottom of the grooves 24 in the check plate 23 are also buttressed so that the check plate may not move pivotably rearward or backlash between the bottom plate 9 and the ramp board 15. Thus, the check plate 23 is effectively squeezed between the top plate 15 and the bottom plate 9, and has the effect of a kind of elastomer under a squeezed condition.

Figure 2:
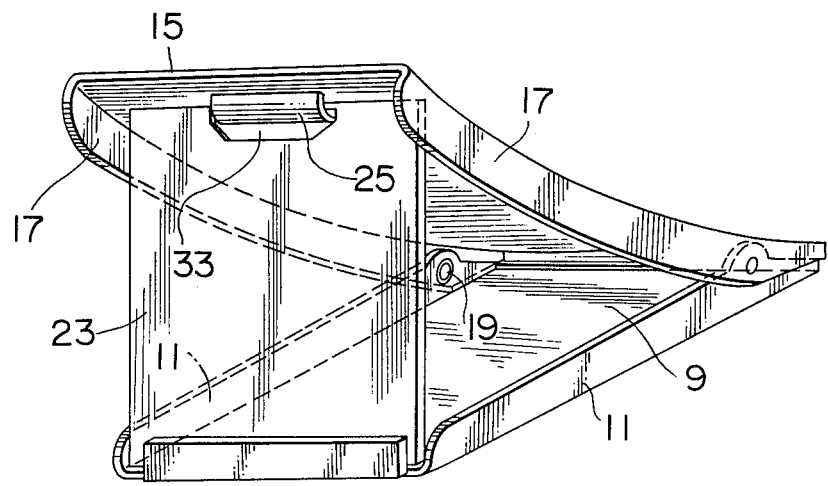
FIG. 2 illustrates the apparatus of U.S. Pat. No. 4,109,763.
Figure 3:
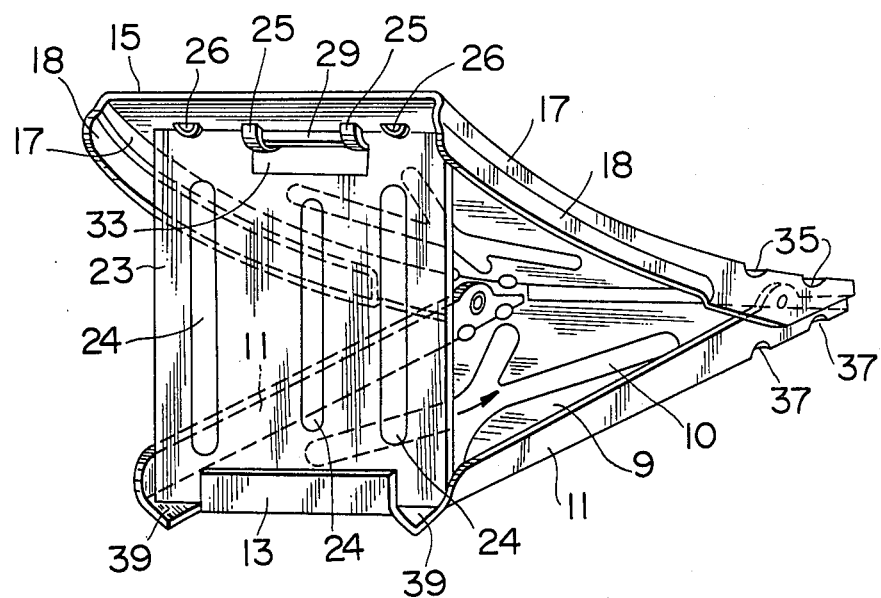
FIG. 3 is a perspective view of a first embodiment of the present invention.
Figure 4:
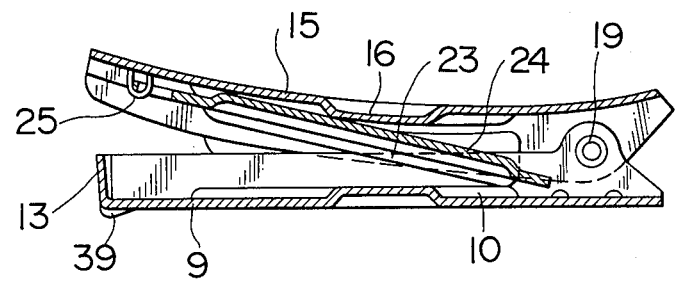
FIG. 4 shows the embodiment of FIG. 3 in a collapsed posture.

With the above construction, the check plate is arranged on the ground with the check portion 13 having a posture as in FIG. 2, so as to stop the wheels of automobiles, etc. The wheel stopping apparatus can be collapsed by rotating the check plate 23 in the direction of the arrow of FIG. 3. Furthermore, if the ramp plate 15 is collapsed downward, it will be understood that the present apparatus will take on a thin construction and be of portable compact dimensions. (See FIG. 4.)

As described hereinbefore, a wheel stop apparatus according to the present invention provides a check plate 23 pivotably mounted to the upper portion of a ramp board plate 15 which is furthermore pivotably mounted to the lateral sides 11 of a bottom plate 9. The lower end of the check plate 23 is mounted pivotably to the opposite end of the bottom plate 9 so as to form the wheel stopping apparatus. A plurality of shaft bearings 25 are arranged by cutting and bending one side of the upper portion of the ramp board 15 so as to connect the ramp board to the check plate 23. The underside of the ramp board further comprises checking rises 26 which are arranged on either side of the shaft bearings 25, with the upper portion of the check plate 23 being partially cut open along the upper edge 31 so that the transversely prolonged axial portion 29 may be removably inserted to the axial portions of the shaft bearings 25 of the ramp board 15, and the upper edge 31 of the check plate 23 is thereby tightly fitted to said checking rises 26. Such construction provides the ramp board 15 to be stably fitted to the check plate 23.

With a structure according to the present invention, the lateral plates of the ramp board have thickened portions which permit the apparatus to be collapsed even if the lateral plates are deformed. Also, even if an automobile should run over the check plate 23 while in a collapsed position, the lateral plate of the check plate and the bottom plate will never be deformed because they are covered and protected by the thickened portions. It is to be understood that the present invention is not to be limited by the above description of the preferred embodiment, and may be effected within different modes.

What is claimed is:

1. Wheel stop apparatus, comprising:
 a bottom plate having a pair of lateral sides;
 a ramp board having a pair of lateral sides;
 means pivotably interconnecting said ramp board to said bottom plate adjacent respective lateral sides of said bottom plate and ramp board;
 a check plate hingedly connected to the underside of said ramp board adjacent the lateral side opposite said pivotable interconnection;
 said check plate having a pair of mutually spaced apart end edges, and having an open portion adjacent one said end edge so as to form an axle between said one end edge and said open portion;
 a pair of separate and mutually spaced apart axle bearing members each formed on the underside of said ramp board and extending downwardly and around said axle of said check plate, so that said axle and said pair of bearing members comprises said hinged interconnection between check plate and ramp board; and
 a pair of checking protrusions formed on the underside of said ramp board;
 said checking protrusions respectively flanking said pair of axle bearing members and located in relation to said check plate axle so as to be engaged by said one end of the check plate when said ramp board and bottom plate are pivotably opened and said check plate is pivoted to extend away from the ramp board underside;
 so that the other said end edge of said check plate engages said plate to maintain said pivotable separation of ramp board and bottom plate; and
 said checking protrusions, by engaging the check plate, stabilize said hinged interconnection of ramp board and check plate.

2. Apparatus as in claim 1 wherein:
 said check plate has at least one raised portion between said end edges, operative to engage the underside of said ramp board when the check plate is withdrawn from engagement with said bottom plate and disposed between the pivotably closed ramp board and bottom plate,
 so that said raised portion keeps the ramp board from damaging contact with the bottom plate.

3. A foldable wheel stop apparatus comprising:
 a bottom plate of plate material approximately rectangular in shape, which includes side flanges bent up along both opposite sides of nearly constant width and an end flange bent up along its intermediate side of nearly constant width;
 a ramp board of plate material approximately rectangular in shape, which includes side flanges bent down along opposite sides of nearly constant width;
 the adjacent ends of said side flanges of one of said bottom plate and said ramp board being formed with punched out holes, and the adjacent ends of said side flanges of the other of said bottom plate and said ramp board being formed with projections extending toward said holes, whereby said ramp board is pivotally attached to said bottom plate;
 plural bearing members punched from the surface of said ramp board at the end of said ramp board remote from said projections and holes, said bearing members oriented parallel to the pivot axis of said bottom plate with said ramp board;
 a check plate of plate material approximately rectangular in shape and slightly smaller in width and length than the width and length of said ramp board rotatably attached at one of its ends to the bearing members of said ramp board;
 said bearing members characterized by having been formed by cutting a plurality of lips from the plate material of said ramp board and curved and projected downwardly;
 said check plate defining an opening adjacent one of its edges and having a side parallel to a side edge of the check plate to form an axle between the side edge and the opening;
 the curved portions of said bearing members extending through said opening and around said axle to form a hinge between said check plate and ramp board; and
 a pair of checking protrusions cut out from said ramp board in flanking relation to said plural bearing members, so that said checking protrusions project downwardly to engage said one end of said check plate alongside said axle and thereby stabilize the hinge connection between said check plate and said ramp board.

* * * * *